Oct. 1, 1963 P. H. SHERRON 3,105,271

TELEPHONE CORNER ASSEMBLY FOR TELEPHONE BOOTHS

Filed Jan. 24, 1961 2 Sheets-Sheet 1

*INVENTOR.*
PERCIVAL H. SHERRON
*BY*
Bauer, Smith & Harding
ATTORNEYS

Oct. 1, 1963 P. H. SHERRON 3,105,271

TELEPHONE CORNER ASSEMBLY FOR TELEPHONE BOOTHS

Filed Jan. 24, 1961 2 Sheets-Sheet 2

INVENTOR.
PERCIVAL H. SHERRON
BY
Busser, Smith & Harding
ATTORNEYS

United States Patent Office 3,105,271

Patented Oct. 1, 1963

3,105,271

TELEPHONE CORNER ASSEMBLY FOR TELEPHONE BOOTHS

Percival H. Sherron, Jamaica, N.Y. (% Sherron Metallic Corp., 1201 Flushing Ave., Brooklyn 37, N.Y.)

Filed Jan. 24, 1961, Ser. No. 84,579
4 Claims. (Cl. 20—3.5)

This invention relates generally to telephone booths, and particularly to an improved assembly for the telephone corner of such a booth.

An object of the invention is to provide a telephone booth with a telephone corner assembly including a one-piece corner post which not only materially simplifies fabrication and assembly of the telephone booth, but also materially facilitates the entry of power and telephone lines.

Other objects of the invention will become apparent when the following specification is read with reference to the accompanying drawings, in which.

Figure 1:
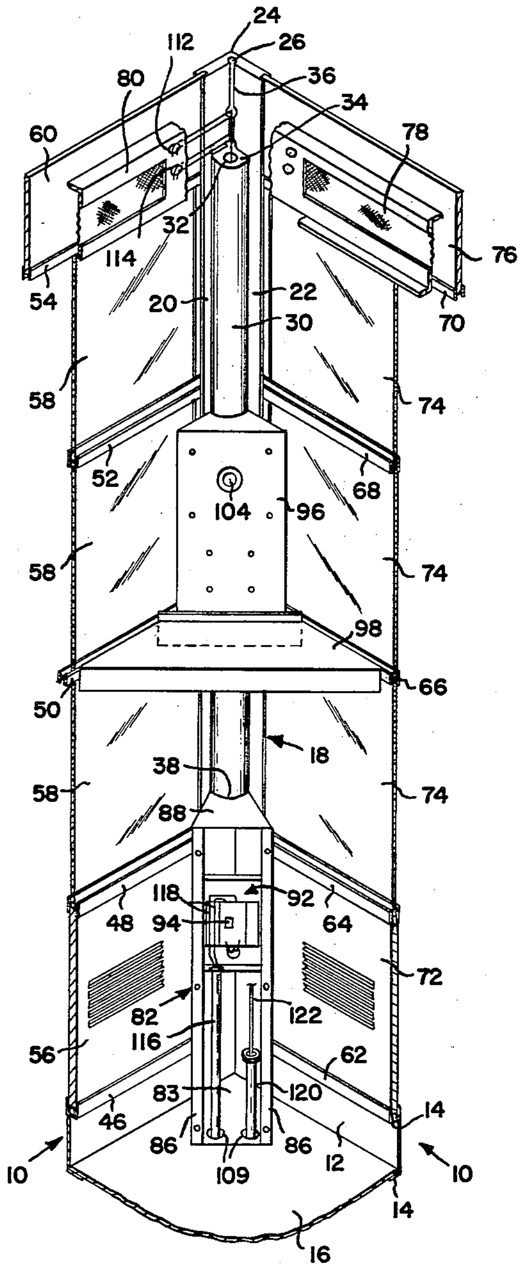
FIGURE 1 is a perspective view looking downwardly and at the telephone corner of a telephone booth, parts being omitted and others being broken away for the sake of clarity.
Figure 2:
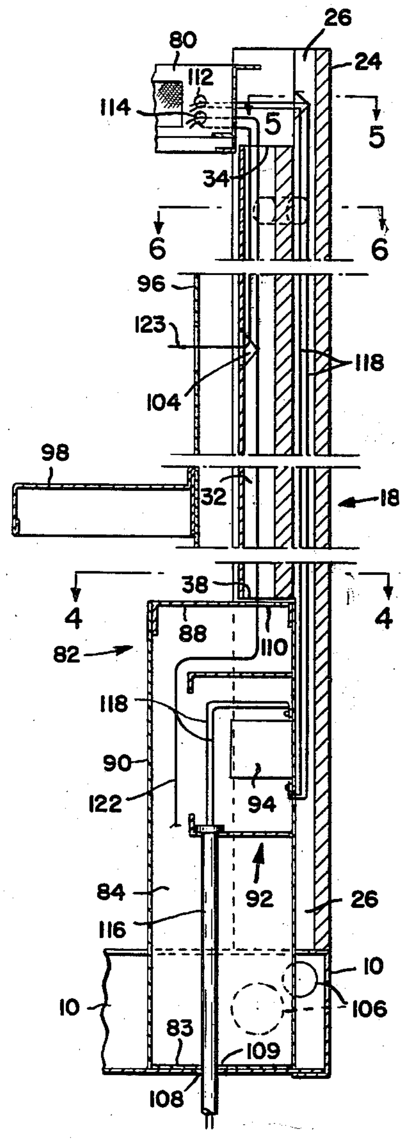
FIGURE 2 is a vertical section on a plane extending diagonally through the telephone corner of the booth, parts being omitted for the sake of clarity.
Figures 3, 4, 5, 6, 7, 8:
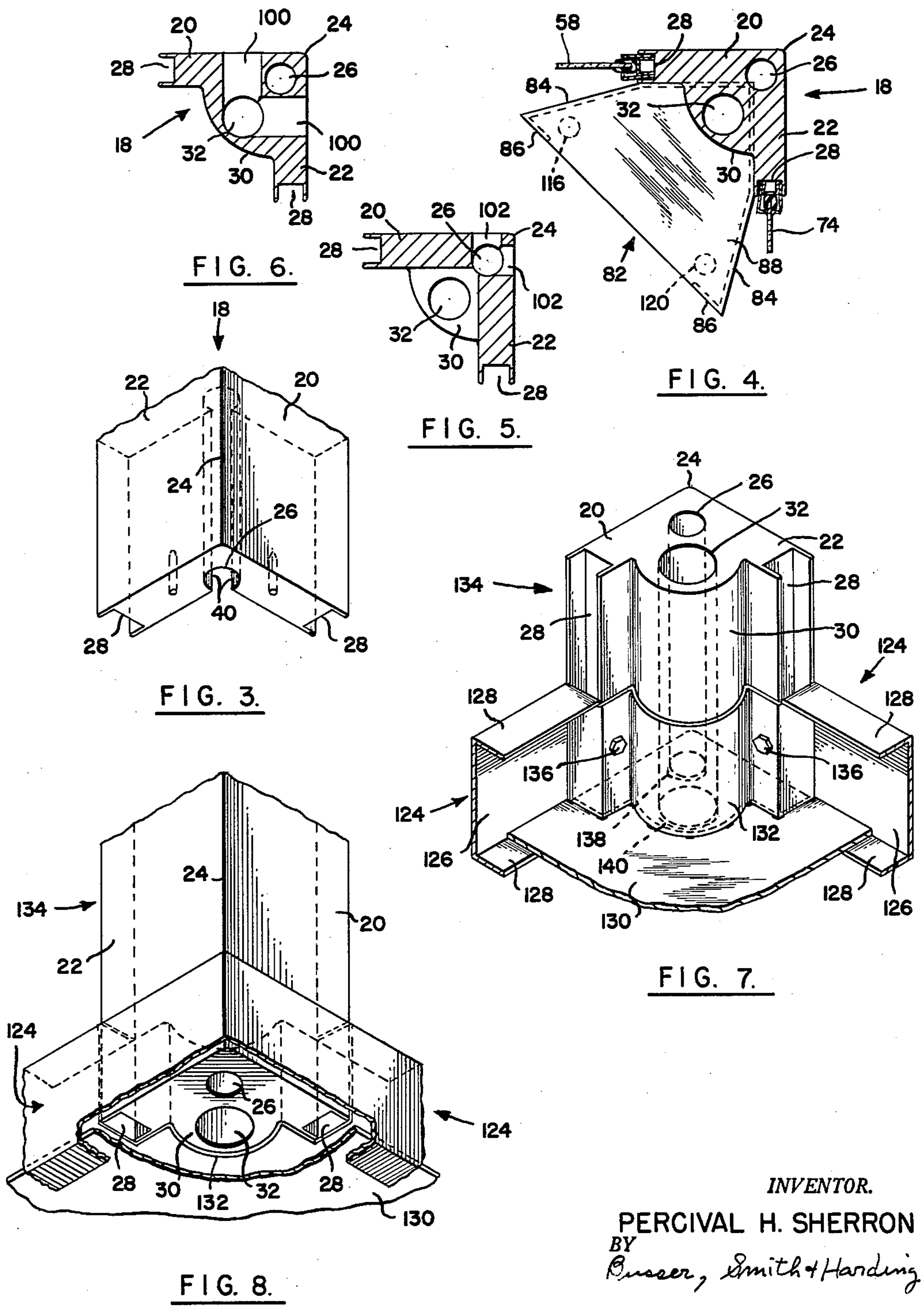
FIGURE 3 is a perspective view looking upwardly at the bottom of the corner post, from outside the booth.

FIGURES 4, 5 and 6 are enlarged horizontal sections respectively on the planes indicated by lines 4—4, 5—5 and 6—6 of FIGURE 2;

FIGURE 7 is a perspective view looking downwardly and at the telephone corner of a modified telephone booth structure; and FIGURE 8 is a perspective view looking upwardly at the post shown in FIGURE 7 from outside the telephone booth, parts being broken away for the sake of clarity.

Referring particularly to FIGURES 1 to 6, the telephone corner assembly of a telephone booth constructed in accordance with the invention comprises a pair of horizontally extending base members 10 that are channel shaped in transverse section. These base members are disposed normal to one another, and each is provided with a web 12 and flanges 14. The lower flanges 14 carry a floor plate 16, while the upper flanges 14 have seated thereon the lower terminal portion of a corner post, generally designated 18.

This post includes a main body part including a pair of legs 20 and 22 disposed normal to one another and merging to form a longitudinally extending heel 24. Extending throughout the full length of the post, through the main body thereof, is an opening 26, and also extending throughout the full length of the post, along the edges of the legs 20 and 22 most remote from the heel 24, are deep recesses designated 28. In the angle included between legs 20 and 22 is a rather large convex fillet 30 having formed therein a through opening 32. The upper end 34 of the fillet is set back from the upper end of the post so as to form on the inner surface of the main body part of the post a longitudinally extending slit 36 communicating with the through opening 26. The lower end 38 of the fillet is set back from the lower end of the post thereby to form on the inner face of the main body part of the post a longitudinally extending slit 40 communicating with the through opening 26. The lower end portion of the post is seated upon the upper flanges 14 of the base members 10. Studs (not shown) projected upwardly through the flanges 14 are threaded into the lower end of the post.

The rear of the booth is provided with an upright wall including a channel member 46 affixed to the upper flange 14 of the underlying base member 10 and horizontally extending H-sections 48, 50, 52 and 54 having corresponding end portions received by the associated recess 28 and affixed to the leg 20 of the corner post. Suitably mounted in the space between channel 46 and H-section 48 is a sheet metal panel 56, and suitably mounted between the H-sections 48, 50, 52 and 54 are glass panels 58. Above the H-section 54 is a horizontally extending sheet metal lintel 60. Vertically extending marginal portions of the panels 56, 58 and lintel 60 are suitably received by the associated recess 28 and suitably framed into the leg 20 of the corner post by conventional means.

The side of the booth is provided with a horizontally extending channel 62 affixed to the upper flange 14 of the underlying base member 10 and horizontally extending H-sections 64, 66, 68 and 70 having corresponding end portions received by the associated recess 28 and affixed to the leg 22 of the corner post. Suitably mounted in the space between the channel 62 and H-section 64 is a sheet metal panel 72 and between the H-sections 64, 66, 68 and 70 are glass panels 74. Above the H-section 70 is a horizontally extending sheet metal lintel 76. Vertically extending marginal portions of the panels 72, 74 and lintel 76 are suitably received by the associated recess 28 and suitably framed into the leg 22 of the corner post by conventional means.

The booth is provided with a ceiling structure, of which only screened side walls 78 and 80 are shown.

At the base of the corner post is an enclosure or housing, generally designated 82, having a bottom wall 83 and opposite side walls 84 converging rearwardly toward the corner post and terminating in sections disposed normal to each other and nested in the main body portion of the post. The side walls 84 are flanged, as at 86. The upper end of the housing is closed by a horizontally extending wall 88, while the front of the housing is closed by a cover 90. Within the housing is means generally designated 92 for mounting a circuit breaker designated 94. Reference may be had to my application Serial No. 49,263, filed August 12, 1960, for a housing having the same purpose as housing 82 and basically constructed in the same manner.

Mounted upon the post are conventional back board 96 and horizontally extending shelf 98.

The post is provided with a pair of openings 100 extending respectively inwardly from the outer surfaces thereof to the opening 32 and with a pair of openings 102 extending from the outer surfaces of the post to the opening 26. The post is also provided with an opening 104 extending inwardly from the outer face of the fillet 30 to the opening 32. The base members are provided with knockouts, designated 106. The floor plate 16 and the bottom 83 of the housing 82 are provided with registering openings 108 and 109, and the top 88 of the housing is provided with an opening 110. The walls 78 and 80 of the ceiling structure are each provided with openings 112 and 114. These various openings facilitate the entry of power and telephone lines. For example, a conduit 116 accommodates a power line 118 which has the circuit breaker 94 connected therein and which extends from the circuit breaker, through the slit 40 and upwardly through the opening 26. Emerging from the opening 26 through slit 36, the line 118 enters the ceiling structure through opening 112 in the ceiling side wall 80. In addition, a conduit 120 accommodates a telephone line 122, which extends upwardly through the opening 110 in the top 88 of housing 82 and through the opening 32 in the post. Emerging from the opening 32, the line 122 enters the ceiling structure through opening 114 in the ceiling side wall 78. A telephone line lead 123 extends through the opening 114 and downwardly through the opening 32 and passes out of the post through the opening 104 to the back board 96.

Referring particularly to FIGURES 7 and 8, the modified embodiment of the corner assembly comprises a pair of base members 124 channel shaped in transverse section. These members are disposed normal to one another and each has a web 126 and flanges 128. The lower flanges 128 carry a horizontally extending floor plate 130, and affixed to this floor plate, as by welding, is a hollow piece 132 which, in transverse section, is formed to receive the lower end portion of the corner post, designated 134, which corner post is in every respect the same as corner 18 except that the fillet extends downwardly to the bottom of the post. Studs, designated 136, project through the wall of the hollow piece 132 and are threaded into the legs of the post to secure the same in position. The floor plate 130 is provided with openings 138 and 140 which register with openings 26 and 32 in the post 134. The telephone and power lines may be passed through these openings.

It will be understood, of course, that the present invention is susceptible of various modifications which may be made without departing from the general principles of the invention. Accordingly, it is intended to claim the same broadly as well as specifically, as indicated by the appended claims.

What is claimed is:

1. In a telephone booth structure, a corner assembly comprising a base frame having a corner section, a one-piece upright corner post mounted upon said corner section including a main body part having a pair of legs normal to each other and merging to form a longitudinally extending heel, said main body part being provided with a full length through opening proximate said heel and a pair of full length open recesses respectively in the edges of said main body part most remote from said heel, and a fillet in the angle included between said legs, the upper terminal of said fillet being set back from the upper terminal of said main body part, the inner face of the portion of said main body part above said fillet being provided with a full length open slit communicating with one side of said through opening, and said fillet being provided with a full length through opening, means providing a pair of upright booth walls having edges received respectively by said recesses, and housing means at the foot of said post having an opening registering with the opening through said fillet.

2. In a telephone booth structure, a corner assembly comprising a base frame having a corner section, a one-piece upright corner post mounted upon said corner section including a main body part having a pair of legs normal to each other and merging to form a longitudinally extending heel, said main body part being provided with a full length through opening proximate said heel and a pair of full length open recesses respectively in the edges of said main body part most remote from said heel, and a fillet in the angle included between said legs, the lower terminal of said fillet being set back from the lower terminal of said main body part, the inner face of the portion of said main body part below said fillet being provided with a full length open slit communicating with one side of said through opening, and said fillet being provided with a full length through opening, means providing a pair of upright booth walls having edges received respectively by said recesses, and a housing immediately below said fillet and nested in the portion of said main body part below said fillet, said housing being provided with an opening registering with the opening through said fillet.

3. In a telephone booth structure, a corner assembly comprising a horizontally extending floor member, and a base frame having a pair of members extending above said floor member and forming a corner of said base frame, a one-piece upright corner post mounted upon said base members including a main body part having a pair of legs normal to each other and merging to form a longitudinally extending heel, said main body part being provided with a full length through opening proximate said heel and a pair of full length recesses respectively in the edges of said main body part most remote from said heel, and the lower terminal portion of said main body part being seated upon and affixed to said base members, and a fillet in the angle included between said legs, the lower terminal of said fillet being set back from the lower terminal of said main body part, the inner face of the portion of said main body part below said fillet being provided with a full length open slit communicating with one side of said through opening, and said fillet being provided with a full length through opening, means over said base members providing a pair of upright booth walls received respectively by said recesses, and a housing mounted upon said floor member and extending upwardly to said fillet, said housing being nested in said base members and in the portion of said main body part below said fillet, said floor and base members and housing being provided with openings for the reception of electrical lines.

4. In a telephone booth structure, a corner assembly comprising a horizontally extending floor member, a base frame having a pair of members extending above said floor member and disposed normal to each other, means on said floor plate and between the ends of said base members providing a hollow piece having an open top, a one-piece upright corner post including a main body part having a pair of legs normal to each other and merging to form a longitudinally extending heel, said main body part being provided with a full length through opening proximate said heel and a pair of full length open recesses respectively in the edges of said main body part most remote from said heel, and a fillet in the angle included between said legs, said fillet being provided with a full length through opening, the lower terminal portion of said post being closely fitted into and affixed to said hollow piece, and means over said base members providing a pair of upright booth walls received respectively by said recesses, said floor member being provided with openings registering into said post openings.

References Cited in the file of this patent

UNITED STATES PATENTS

| | | |
|---|---|---|
| 310,133 | Haase | Dec. 30, 1884 |
| 501,088 | Leaver | July 11, 1893 |
| 1,189,949 | Holmes | July 4, 1916 |
| 1,328,324 | Gwyer | Jan. 20, 1920 |
| 1,857,913 | Judelson | May 10, 1932 |
| 2,456,929 | Dee | Dec. 21, 1948 |
| 2,912,073 | Sherron | Nov. 10, 1959 |